Patented July 3, 1945

2,379,610

UNITED STATES PATENT OFFICE 2,379,610

COATING COMPOSITIONS CONTAINING HYDROCARBON POLYMERS

Robert C. Swain, Riverside, and Pierrepont Adams, Stamford, Conn., assignors to American Cyanamid Company, New York, N. Y., a corporation of Maine No Drawing. Application October 5, 1940, Serial No. 359,896

4 Claims. (Cl. 260—42)

This invention relates to coating compositions containing hydrocarbon polymers such as essentially indene polymers and melamine-formaldehyde resin.

An object of this invention is to improve the physical and chemical properties of hydrocarbon polymers such as essentially indene compositions, e. g., light stability, color, sensitivity to solvents, etc.

Another object of this invention is to provide compositions containing hydrocarbon polymers such as essentially indene polymers and compatible proportions of compatible melamine-formaldehyde resins.

These and other objects are attained by blending hydrocarbon polymers such as essentially indene polymers having a melting point of at least about 150° C. with a melamine-formaldehyde resin which has been alkylated with an aliphatic alcohol containing at least 4 carbon atoms wherein the proportion of melamine resin is not more than about 20% and preferably not more than 10%. The percentage composition in each instance in this paragraph is given on a total solids weight basis.

The following examples in which the proportions are in parts by weight are given by way of illustration and not in limitation.

The essentially indene polymer used in the following examples is a product melting above 150° C. and sold under the trade name of "Nevindene R–3" by the Neville Company.

Example 1

| | Parts |
|---|---|
| Melamine-formaldehyde resin "A" | 10 |
| Polymerized indene ("Nevindene R–3") | 90 |

A composition containing these ingredients is prepared by admixing 20 parts of melamine-formaldehyde resin "A" solution (50% resin) with 180 parts of "Polymerized indene stock solution" (containing 50% of polymerized indene resin and 50% of xylene). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "B" | 10 |
| Polymerized indene ("Nevindene R–3") | 90 |

A composition containing these ingredients is prepared by admixing 20 parts of melamine-formaldehyde resin "B" solution (50% resin) with 180 parts of "Polymerized indene stock solution." Films of the composition are applied to metal objects and baked at a temperature of about 135° C. for about one-half hour. A clear, tough film is formed.

Example 3

| | Parts |
|---|---|
| Melamine-formaldehyde resin "C" | 10 |
| Polymerized indene ("Nevindene R–3") | 90 |

A composition containing these ingredients is prepared by admixing 20 parts of melamine-formaldehyde resin "C" solution (50% resin) with 180 parts of "Polymerized indene stock solution." Films of the composition are applied to metal objects and baked at a temperature of about 135° C. for about one-half hour. The product formed is a very hard, clear coating.

Example 4

| | Parts |
|---|---|
| Melamine-formaldehyde resin "D" | 10 |
| Polymerized indene ("Nevindene R–3") | 90 |

A composition containing these ingredients is prepared by admixing 20 parts of melamine-formaldehyde resin "D" solution (50% resin) with 180 parts of "Polymerized indene stock solution." Films of the composition are applied to metal objects and baked at a temperature of about 135° C. for about one-half hour. A water-white film having good chemical properties is formed.

Example 5

| | Parts |
|---|---|
| Melamine-formaldehyde resin "E" | 10 |
| Polymerized indene ("Nevindene R–3") | 90 |

A composition containing these ingredients is prepared by admixing 20 parts of melamine-formaldehyde resin "E" solution (50% resin) with 180 parts of "Polymerized indene stock solution." Films of the composition are applied to metal objects and baked at a temperature of about 135° C. for about one-half hour. A hard, transparent film is produced.

*Preparation of melamine-formaldehyde resin "A"*

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap.

During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "B"*

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "C"*

| | Parts |
|---|---|
| Melamine (1 mol) | 125 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "D"*

| | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80–85° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. This solution is essentially a hexylated resin in hexyl alcohol all or nearly all of the methanol having been eliminated from it during the distillation. The resulting resin solution may be diluted to about 50% solids with any desired solvent or diluent, e. g., xylene.

*Preparation of melamine-formaldehyde resin "E"*

| | Parts |
|---|---|
| Melamine-formaldehyde (molal ratio 1:4) spray-dried powder | 200 |
| Octyl alcohol (2-ethyl hexanol) | 280 |
| n-Butanol | 320 |
| Methyl acid phosphate | 4 |

The melamine-formaldehyde condensation product is obtained by refluxing melamine and formalin (37% formaldehyde in water) in the molal ratio of 1:4 at a pH of about 7–9 for about 3 hours and then spray-drying.

The spray-dried melamine-formaldehyde powder, octanol, butanol and methyl acid phosphate are heated to about 100–105° C. in 30 minutes and refluxed about 30 minutes. This solution is vacuum concentrated at about 50–70° C. to form a product containing about 50% solids.

Polyindene resins suitable for use according to our invention may be produced by treating coal tar solvent naphtha containing indene with a strong acid, e. g., sulfuric acid, and recovering the polymer thus produced. The polymerization is carried to the point that the polymer has a melting point of at least about 150° C. It is to be noted that the melting point of indene polymers is an index of the degree of polymerization and it is also an index of the compatibility characteristics of the material. Polymers suitable for use according to our invention should have a melting point of at least about 150° C., e. g., around 160° C. In place of part or all of the essentially indene polymer used in the above examples, polymers which contain varying proportions of coumarone but having the same general characteristics may be substituted.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the amyl alcohols, the hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with higher alcohols is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instances basic catalysts may desirably be utilized.

The melamine-formaldehyde resins vary slightly according to minor variations of control during their production and in some instances small proportions of a suitable solvent material, e. g., benzene, xylene, toluene, acetone, etc., may be added to the original solutions of essentially indene polymers and melamine-formaldehyde resin in order to produce perfectly clear solutions if such solutions are not originally obtained.

While formaldehyde has been used in the previous examples, it will be obvious that other aldehydes such as various polymers of formaldehyde, e. g., paraformaldehyde, or substances which yield formaldehyde may be used in place of part or all of the formaldehyde.

The melamine resins suitable for use according to our invention may be alkylated with straight and branched chain aliphatic alcohols containing at least 4 carbon atoms. Obviously various mixtures of alcohols may be used. The term "alkylated melamine-formaldehyde resin" is intended to denote compositions which are reacted with an alcohol.

Essentially indene polymers of the type employed herein have been found to be compatible with no more than about 20% of melamine-formaldehyde resin (total solids weight basis) alkylated with alcohols containing at least 4 carbon atoms wherein the molal ratio of formaldehyde to melamine is about 4:1 up to 6:1. While higher ratios of formaldehyde to melamine than 6:1 may be used it is generally undesirable inasmuch as formaldehyde is lost during the curing so that usually the product in its cured condition does not contain more than about 6 mols of formaldehyde to 1 mol of melamine.

Our compositions may be used in admixture with other resinous compositions, e. g., urea-formaldehyde resins, phenol-formaldehyde resins, ester gum, chlorinated rubbers, alkyd resins, modified alkyd resins such as the terpene-maleic acid-polyhydric alcohol resins, etc. They may also be used in drying oil vehicles such as linseed oil and the like, especially in combination with soluble phenol-formaldehyde resin materials.

A wide variety of plasticizers may be incorporated into our products such as the alkyl phthalates, tricresyl phosphate, alkyd resins, etc.

Various fillers, pigments, dyes and lakes may be added to our compositions, e. g., lithopone, zinc oxide, titanium oxide, ferric oxide, Prussian blue, toluidine red, malachite green, mica, ground glass, glass fibers, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Mixtures of melamine-formaldehyde resin and essentially indene polymers are especially suitable for use in coating compositions which require good alkali resistance, good heat resistance, good water resistance, etc. Accordingly, they are useful in floor varnishes, pipe coatings and in various other coating compositions including paints, enamels, lacquers, etc. Our products may also be useful as adhesives, in the production of printing inks, in treating paper and cloth, especially for use in the electrical industry, etc. One advantage of our melamine-formaldehyde resin-essentially indene polymer mixtures of especial importance is the reduced solubility and thermoplasticity as compared to compositions not containing any melamine-formaldehyde resin. The melamine-formaldehyde resin improves the color stability upon exposure to light of the essentially indene resins as well as improving resistance to various corrosive materials.

The term "compatible" as used herein is intended to denote compositions, films of which are clear and homogeneous after baking.

Obviously, many modifications and variations in the processes and compositions described above may be made without departing from the spirit and scope of the invention as defined in the appended claims.

We claim:

1. A coating composition containing an essentially indene polymer having a melting point of at least about 150° C. and not more than about 20% of a melamine-formaldehyde resin (total solids weight basis) which has been reacted with an aliphatic alcohol containing at least 4 carbon atoms and wherein the molal ratio of formaldehyde to melamine is at least about 4:1.

2. A coating composition containing an essentially indene polymer having a melting point of at least about 150° C. and not more than about 10% of a melamine-formaldehyde resin (total solids weight basis) which has been reacted with an aliphatic alcohol containing at least 4 carbon atoms and wherein the molal ratio of formaldehyde to melamine is at least about 4:1.

3. A coating composition containing an essentially indene polymer having a melting point of at least about 150° C. and not more than about 10% of a melamine-formaldehyde resin (total solids weight basis) which has been reacted with a butyl alcohol and wherein the molal ratio of formaldehyde to melamine is at least about 4:1.

4. A coating composition containing an essentially indene polymer having a melting point of at least about 150° C. and not more than about 10% of a melamine-formaldehyde resin (total solids weight basis) which has been reacted with an octyl alcohol and wherein the molal ratio of formaldehyde to melamine is at least about 4:1.

ROBERT C. SWAIN.
PIERREPONT ADAMS.